(12) United States Patent
Burkman et al.

(10) Patent No.: US 10,384,627 B2
(45) Date of Patent: Aug. 20, 2019

(54) PRE-CHARGING LOAD USING MAIN CONTACTOR COIL

(71) Applicant: FORD GLOBAL TECHNOLOGIES, LLC, Dearborn, MI (US)

(72) Inventors: Wesley Edward Burkman, Dearborn, MI (US); Robert Bolduc, Northville, MI (US); Benjamin A. Tabatowski-Bush, South Lyon, MI (US); Arnold Kweku Mensah-Brown, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 362 days.

(21) Appl. No.: 15/232,560

(22) Filed: Aug. 9, 2016

(65) Prior Publication Data

US 2018/0043847 A1  Feb. 15, 2018

(51) Int. Cl.
| | | |
|---|---|---|
| *B60K 6/22* | (2007.10) | |
| *B60R 16/03* | (2006.01) | |
| *B60W 20/10* | (2016.01) | |
| *B60L 1/00* | (2006.01) | |
| *B60L 50/10* | (2019.01) | |

(52) U.S. Cl.
CPC ............... *B60R 16/03* (2013.01); *B60K 6/22* (2013.01); *B60L 1/00* (2013.01); *B60L 50/10* (2019.02); *B60W 20/10* (2013.01); *B60Y 2200/91* (2013.01); *B60Y 2200/92* (2013.01); *B60Y 2300/188* (2013.01); *Y02T 10/70* (2013.01); *Y02T 10/7077* (2013.01); *Y10S 903/904* (2013.01)

(58) Field of Classification Search
None
See application file for complete search history.

(56) References Cited

U.S. PATENT DOCUMENTS

| | | | |
|---|---|---|---|
| 7,304,402 B2 | 12/2007 | Osawa et al. | |
| 8,203,810 B2 | 6/2012 | Bryan et al. | |
| 8,884,309 B2 | 11/2014 | Miura | |
| 2005/0219162 A1* | 10/2005 | Tsuge | G09G 3/30 345/76 |
| 2013/0119903 A1* | 5/2013 | Weiss | H02H 7/125 318/400.3 |
| 2013/0169038 A1 | 7/2013 | King | |
| 2015/0219706 A1 | 8/2015 | Loftus et al. | |
| 2015/0229123 A1 | 8/2015 | Ngo | |
| 2015/0251542 A1* | 9/2015 | Mensah-Brown | B60L 11/005 307/10.1 |
| 2015/0256112 A1* | 9/2015 | Weiss | H02H 7/09 318/51 |
| 2016/0211691 A1* | 7/2016 | Chen | B65D 19/385 |
| 2016/0362004 A1* | 12/2016 | Einhorn | B60L 3/0069 |
| 2018/0134169 A1 | 5/2018 | Loftus et al. | |

* cited by examiner

*Primary Examiner* — Jared Fureman
*Assistant Examiner* — Aqeel H Bukhari
(74) *Attorney, Agent, or Firm* — David Kelley; Brooks Kushman P.C.

(57) ABSTRACT

A vehicle system includes a contactor including a coil and relay, a traction battery, a load, and a controller configured to transfer current from the traction battery through the coil to pre-charge the load without causing the relay to close such that a voltage drop across the relay falls below a threshold value, and subsequently cause the relay to close.

17 Claims, 5 Drawing Sheets

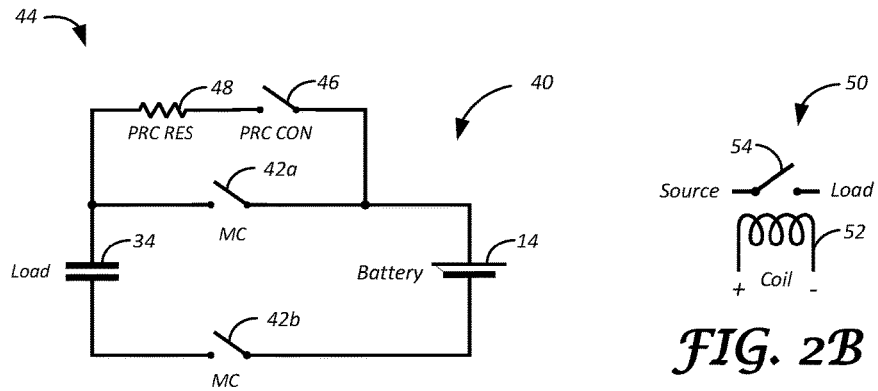
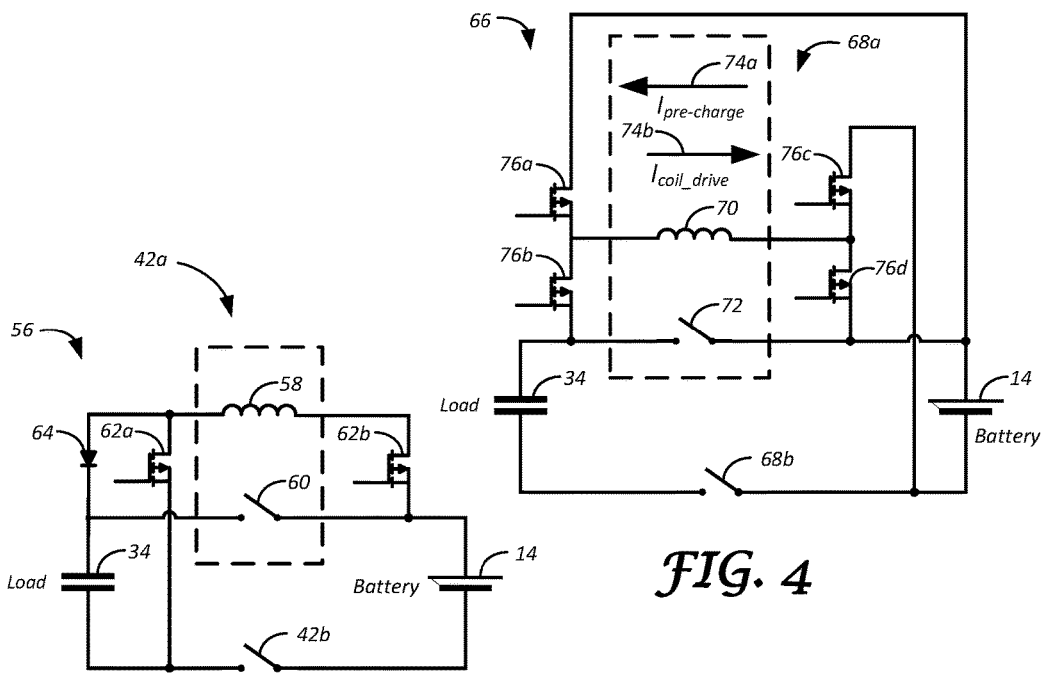
FIG. 2A
FIG. 2B
FIG. 3
FIG. 4

PRE-CHARGING LOAD USING MAIN CONTACTOR COIL

TECHNICAL FIELD

The present disclosure relates to systems and methods for pre-charging an electrical load using a main contactor coil.

BACKGROUND

A hybrid or an electric vehicle may be equipped with at least one traction battery connected to an electrical load and configured to provide energy for propulsion. The traction battery may also provide energy, e.g., via an electrical bus, for other vehicle electrical systems. For example, the traction battery may transfer energy to high voltage loads, such as compressors and electric heaters. In another example, the traction battery may provide energy to low voltage loads, such as an auxiliary 12V battery.

SUMMARY

A vehicle system includes a contactor including a coil and relay, a traction battery, a load, and a controller configured to transfer current from the traction battery through the coil to pre-charge the load without causing the relay to close such that a voltage drop across the relay falls below a threshold value, and subsequently cause the relay to close.

A method for a vehicle includes transferring, by a controller, current from a traction battery through a coil of a contactor to pre-charge a load without causing a relay of the contactor to close such that a voltage drop across the relay falls below a threshold value, and subsequently causing the relay to close.

A vehicle system includes a switching arrangement in connection with a coil and a relay of a contactor, a traction battery, a load, and a controller configured to operate the arrangement to transfer current from the traction battery through the coil to pre-charge the load without causing the relay to close such that a voltage drop across the relay falls below a threshold value, and subsequently cause the relay to close.

BRIEF DESCRIPTION OF THE DRAWINGS

FIG. 2A is a schematic diagram illustrating an arrangement for pre-charging an electrical load;

FIG. 2B is a schematic diagram illustrating a contactor;

FIG. 3 is a schematic diagram illustrating a pre-charge switching arrangement using a main contactor coil;

FIG. 4 is a schematic diagram illustrating a pre-charge switching arrangement using direction of current;

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
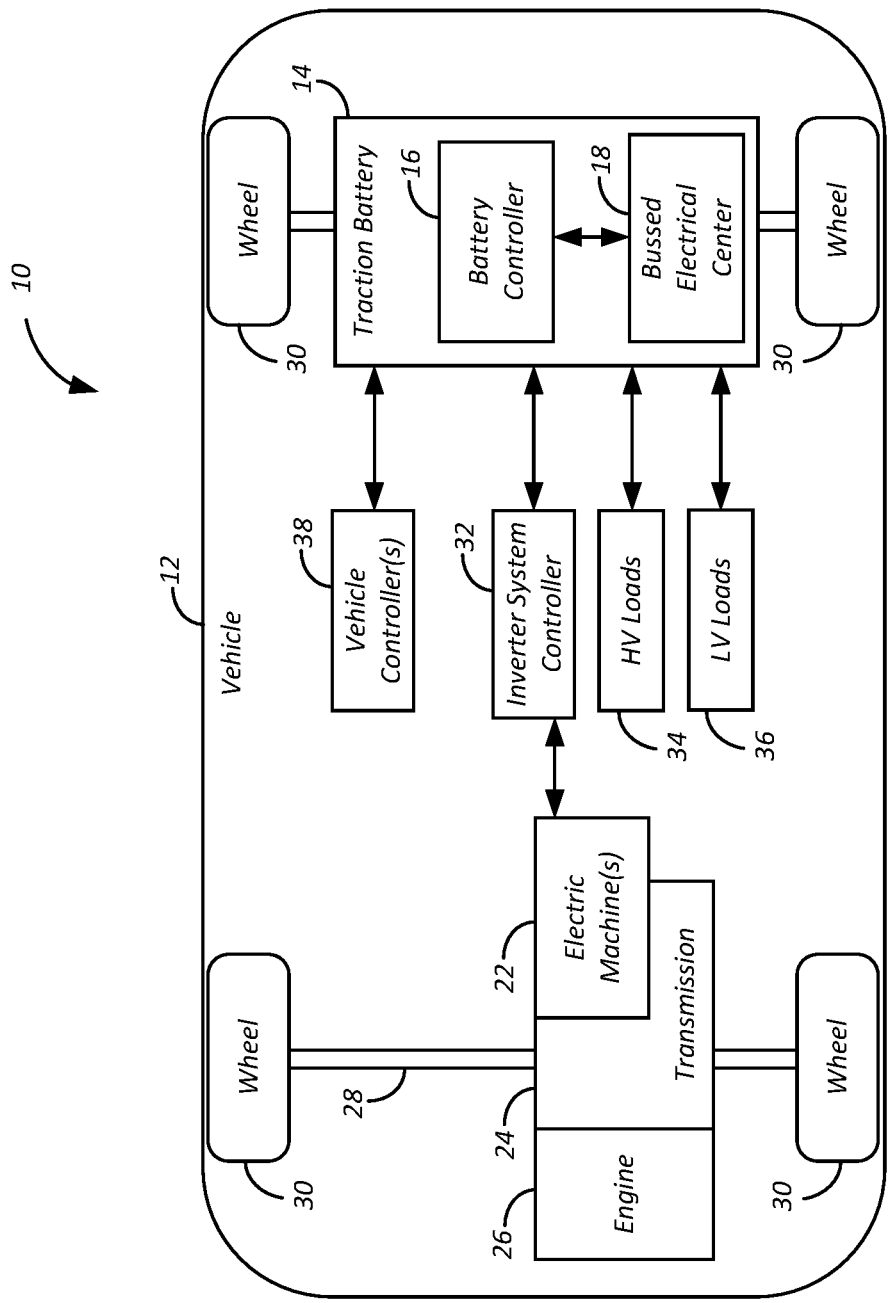
FIG. 1 is a block diagram of a hybrid electric vehicle (HEV) illustrating a typical drivetrain and energy storage components.

FIG. 1 depicts an example hybrid-electric vehicle (HEV) system 10. A hybrid-electric vehicle 12, hereinafter vehicle 12, may comprise at least one traction battery 14. The traction battery 14 includes a battery controller 16 and, in an example, may be configured to receive electric charge via a charging session at a charging station connected to a power grid. In one example, the power grid may include a device that harnesses renewable energy, such as a photovoltaic (PV) solar panel, or a wind turbine.

The traction battery 14 may comprise one or more battery cells (not shown), e.g., electrochemical cells, capacitors, or other types of energy storage device implementations. The battery cells may be arranged in any suitable configuration and configured to receive and store electric energy for use in operation of the vehicle 12. Each cell may provide a same or different nominal threshold of voltage. The battery cells may be further arranged into one or more arrays, sections, or modules further connected in series or in parallel.

The traction battery 14 may further comprise a bussed electrical center (BEC) 18 electrically connected to the battery cells, e.g., such as via a positive and negative battery terminals. As will be described in further detail in reference to at least FIGS. 2A-5, the BEC 18 may be in communication with the battery controller 16 and may include a plurality of connectors and switches allowing the supply and withdrawal of electric energy to and from the traction battery 14.

The battery controller 16 is electrically connected with the BEC 18 and controls the energy flow between the BEC 18 and the battery cells. For example, the battery controller 16 may be configured to monitor and manage temperature and state of charge of each of the battery cells. The battery controller 16 may command the BEC 18 to open or close a plurality of switches in response to temperature or state of charge in a given battery cell reaching a predetermined threshold.

The battery controller 16 may be in communication with one or more vehicle controllers 38, such as, but not limited to, an engine controller (ECM) and transmission controller (TCM), and may command the BEC 18 to open or close a plurality of switches in response to a predetermined signal from the one or more vehicle controllers 38.

The vehicle 12 may further comprise one or more electric machines 22 mechanically connected to a hybrid transmission 24. The electric machines 22 may be capable of operating as a motor or a generator. In addition, the hybrid transmission 24 may be mechanically connected to an engine 26. The hybrid transmission 24 is also mechanically connected to a drive shaft 28 that is mechanically connected to the wheels 30.

The electric machines 22 can provide propulsion and deceleration capability when the engine 26 is turned on or off using energy stored in the traction battery 14, such as via the BEC 18. The electric machines 22 also act as generators and can provide fuel economy benefits by recovering energy that would normally be lost as heat in the friction braking system. The electric machines 22 may also provide reduced pollutant emissions since the vehicle 12 may be operated in electric mode under certain conditions.

The traction battery 14 typically provides a high voltage DC output. The BEC 18 of the traction battery 14 may be electrically connected to an inverter system controller (ISC) 32. The ISC 32 is electrically connected to the electric machines 22 and provides the ability to bi-directionally transfer energy, such as via the BEC 18, between the traction battery 14 and the electric machines 22. In one example, the electric machines 22 and other components of the vehicle 12 supplying and/or receiving energy to and from the traction battery 14 may define a main load 34 of the traction battery 14.

In a motor mode, the ISC 32 may convert the DC output provided by the traction battery 14 to a three-phase alternating current (AC) as may be required for proper functionality of the electric machines 22. In a regenerative mode, the ISC 32 may convert the three-phase AC output from the electric machines 22 acting as generators to the DC voltage required by the traction battery 14. While FIG. 1 depicts a typical hybrid electric vehicle, the description herein is equally applicable to a pure electric vehicle or a hybrid electric vehicle of a different configuration, such as, but not limited to, a series hybrid. For a pure electric vehicle, e.g., battery electric vehicle (BEV), the hybrid transmission 24 may be a gear box connected to the electric machines 22 and the engine 26 may not be present. In one example, the main load 34 of the traction battery 14 in the BEV may include the electric machines 22 and the gear box.

In addition to providing energy for propulsion, the traction battery 14 may provide energy for other vehicle electrical systems (shown generally as auxiliary loads 36). For example, the traction battery 14 may transfer energy to high voltage loads, such as compressors and electric heaters. In another example, the traction battery 14 may provide energy to low voltage loads, such as an auxiliary 12V battery. In such an example, the vehicle 12 may include a DC/DC converter module (not shown) that converts the high voltage DC output of the traction battery 14 to a low voltage DC supply that is compatible with the low voltage loads. The various components discussed may have one or more associated controllers to control and monitor the operation of the components. The controllers may communicate via a serial bus (e.g., Controller Area Network (CAN)) or via discrete conductors.

Referring now to FIG. 2A, an example arrangement 40 of the BEC 18 for energy transfer between the traction battery 14 and the main load (indicated generally using a capacitor symbol) 34 is shown. The arrangement 40 may include a pair of contactors 42a, 42b, such as a positive main contactor and a negative main contactor, electrically connected to corresponding terminals of the traction battery 14. In one example, closing the contactors 42a, 42b completes a circuit between the load 34 and the traction battery 14 allowing the flow of electric energy between the traction battery 14 and the main load 34. In another example, opening one or more of the contactors 42a, 42b opens the circuit between the main load 34 and the traction battery 14 stopping the flow of energy between them. In one instance, the battery controller 16 may command the BEC 18 to open or close one or more of the contactors 42a, 42b in response to receiving a signal from the one or more vehicle controllers 38, e.g., ECM, TCM, and so on, indicative of a request to initiate or terminate transfer of electric energy between the main load 34 and the traction battery 14.

The arrangement 40 may further comprise a pre-charge circuit 44 configured to control an energizing process of one of the terminals of the traction battery 14. The pre-charge circuit 44 may include a pre-charge contactor 46 connected in series with a pre-charge resistor 48. The pre-charge circuit 44 may be electrically connected in parallel with the contactor 42a, such that when the contactor 42a is open, and the pre-charge contactor 46 and the contactor 42b are closed, electric current may flow through the pre-charge circuit 44 providing controlled energizing of the terminal of the main load 34 that is connected with the contactor 42a.

In one example, the battery controller 16 may be configured to initiate a pre-charge procedure using the pre-charge circuit 44 in response to receiving a signal indicative of a request to close the contactors 42a, 42b. The battery controller 16 may, for example, issue one or more commands to the BEC 18 to close the contactor 42b and to close the pre-charge contactor 46 and control current flow toward the terminal of the traction battery 14 in connection with the contactor 42a.

The battery controller 16 may be also configured to terminate the pre-charge procedure in response to voltage across the open contactor, e.g., the contactor 42a, being less than a specified threshold. The battery controller 16 may be further configured to command the BEC 18 to close the contactor 42a in response to voltage across the open contactor 42a being less than a specified threshold.

As shown in FIG. 2B, each of the contactors 42a, 42b and the pre-charge contactor 46 may define an electro-mechanical device 50 comprising an inductive coil 52 and a relay 54. In one example, energizing the inductive coil 52 using a predefined amount of current, e.g., pull-in current $I_{pull\_in}$, causes the relay 54 to close and de-energizing the inductive coil 52, e.g., providing amount of current less than drop-out current $I_{drop\_out}$, causes the relay 54 to open. In another example, following the closing of the relay 54, the electromechanical device 50 may be configured to provide a predefined amount of current, e.g., hold current $I_{hold}$, through the inductive coil 52 to keep the relay 54 in a closed position.

In one instance, pull-in current $I_{pull\_in}$ may be larger than hold current $I_{hold}$ and larger than drop-out current $I_{drop\_out}$. In such an instance, hold current $I_{hold}$ may be larger than drop-out current $I_{drop\_out}$. A value of pull-in current $I_{pull\_in}$ may, for example, be 1.7 amperes (A) with a corresponding value of hold current $I_{hold}$ being 1 A and a corresponding value of drop-out current $I_{drop\_out}$ being 0.5 A. Values of pull-in current $I_{pull\_in}$, hold current $I_{hold}$, and drop-out current $I_{drop\_out}$ for a given contactor may be a function of one or more device characteristics, such as, but not limited to, design and manufacturer specifications, manufacturing methods and materials, testing, contactor age and/or cycling count, and so on.

In reference to FIG. 3, an exemplary arrangement 56 for pre-charging the main load 34 is shown. The contactor 42a may include a coil 58 and a relay 60 as is described, for example, in reference to FIG. 2B. In one example, the contactor 42a may be selectively powered using high-voltage (HV) power, such as DC output of the traction battery 14. A pair of switches 62a, 62b may be electrically connected to and selectively enabled and disabled by the battery controller 16. The battery controller 16 may be configured to enable one or more of the switches 62a, 62b to operate at a same or a different predefined duty cycle to selectively power the coil 58 of the contactor 42a. In an example, a diode 64 may prevent a reverse current flow into the traction battery 14 when the battery controller 16 operates one or more of the switches 62a, 62b.

The battery controller 16 may be configured to enable the switches 62a, 62b to operate at a predefined duty cycle such that a predefined amount of current is generated in the coil 58. The battery controller 16 may, for example, enable the switches 62a, 62b to operate at a duty cycle such that the amount of current flowing through the coil 58 is at least pull-in current $I_{pull\_in}$ of the relay 60, e.g., amount of current corresponding to using the coil 58 to close the relay 60. In another example, the battery controller 16 may enable one or more switches 62a, 62b to operate at a duty cycle such that the amount of current flowing through the coil 58 is less than drop-out current $I_{drop\_out}$ of the relay 60. In still another example, the battery controller 16 may enable one or more switches 62a, 62b to operate at a duty cycle such that the amount of current flowing through the coil 58 is no less than hold current $I_{hold}$ of the relay 60, e.g., amount of current corresponding to holding the relay 60 in a closed position. These are merely examples and operating one or more of the switches 62a, 62b at one or more other duty cycles and/or to generate other current values in the coil 58 is also contemplated.

As described in reference to FIG. 2A, the battery controller 16 may initiate a pre-charge procedure in response to receiving a signal indicative of a request to close the contactors 42a, 42b. The battery controller 16 may command the contactor 42b to close in response to receiving a request to transfer energy between the traction battery 14 and the main load 34. The battery controller 16 may enable the switch 62b to operate at a predefined duty cycle. In one example, the battery controller 16 may enable the switch 62b to operate at a predefined duty cycle such that current flowing through the coil 58 of the contactor 42a is less than a predefined current, e.g. less than pull-in current $I_{pull\_in}$ of the relay 60 such that the relay 60 remains open.

The battery controller 16 may be configured to measure voltage across the contactor 42a while operating the switch 62b such that the relay 60 remains open. In response to voltage across the contactor 42a being less than a threshold voltage, the battery controller 16 may command, e.g., by transmitting a signal to the BEC 18, the contactor 42a to close. In one instance, the battery controller 16 may close the contactor 42a by enabling the switch 62a and the switch 62b to operate at a duty cycle such that current value through the coil 58 is at least pull-in current $I_{pull\_in}$ of the relay 60.

The battery controller 16 may be configured to operate the switches 62a, 62b such that current flowing through the coil 58 is at least pull-in current $I_{pull\_in}$ of the relay 60 for a predefined period. In one example, after a predefined period, the battery controller 16 may enable, e.g., by transmitting a signal to the BEC 18, the switches 62a, 62b to operate at a duty cycle, e.g., such that current through the coil 58 is no less than hold current $I_{hold}$ of the relay 60 and the relay 60 remains closed.

In reference to FIG. 4, an exemplary arrangement 66 for pre-charging the main load 34 is shown. The arrangement 66 may include main contactors 68a, 68b for enabling and disabling energy transfer between the traction battery 14 and the main load 34. The contactor 68a may comprise a coil 70 about a core, such as, but not limited to, a permanent magnet core, where a bi-directional current flow through the coil 70 (e.g., indicated generally using arrows 74a, 74b, respectively) may enable one or more operating characteristics of a relay 72. In one instance, current flowing through the coil 70 in a first direction 74a may cause the relay 72 to open and current flowing through the coil 70 in a second direction 74b may cause the relay 72 to close. The battery controller 16 may be configured to selectively enable and disable a plurality of switches 76a, 76b, 76c, and 76d electrically connected to and capable of generating current across the contactor 68a in one of the first direction 74a and the second direction 74b. In one example, the switches 76a, 76b, 76c, and 76d may be connected in an H-bridge configuration. The battery controller 16 may be configured to enable one or more of the switches 76a, 76b, 76c, and 76d to operate at a same or a different predefined duty cycle to selectively generate current through the coil 70 of the contactor 68a.

In one example, the battery controller 16 may initiate a pre-charge procedure in response to receiving a signal indicative of a request to close the contactors 68a, 68b. The battery controller 16 may command, e.g., by transmitting a signal to the BEC 18, the contactor 68b to close in response to receiving a request to transfer energy between the traction battery 14 and the main load 34. The battery controller 16 may enable the switches 76b, 76d to operate at a predefined duty cycle, e.g., such that current flowing through the coil 70 of the contactor 68a flows in the first direction 74a.

The battery controller 16 may be configured to measure voltage across the contactor 68a while operating the switches 76b, 76d at a predefined duty cycle, e.g., such that current flowing through the coil 70 is in the first direction 74a. In response to voltage across the contactor 68a being less than a threshold voltage, the battery controller 16 may command, e.g., by transmitting a signal to the BEC 18, the contactor 68a to close. In one instance, the battery controller 16 may close the contactor 68a by disabling the switches 76b, 76d and enabling the switches 76a, 76c to operate at a duty cycle such that current through the coil 70 is in the second direction 74b.

Figure 5:
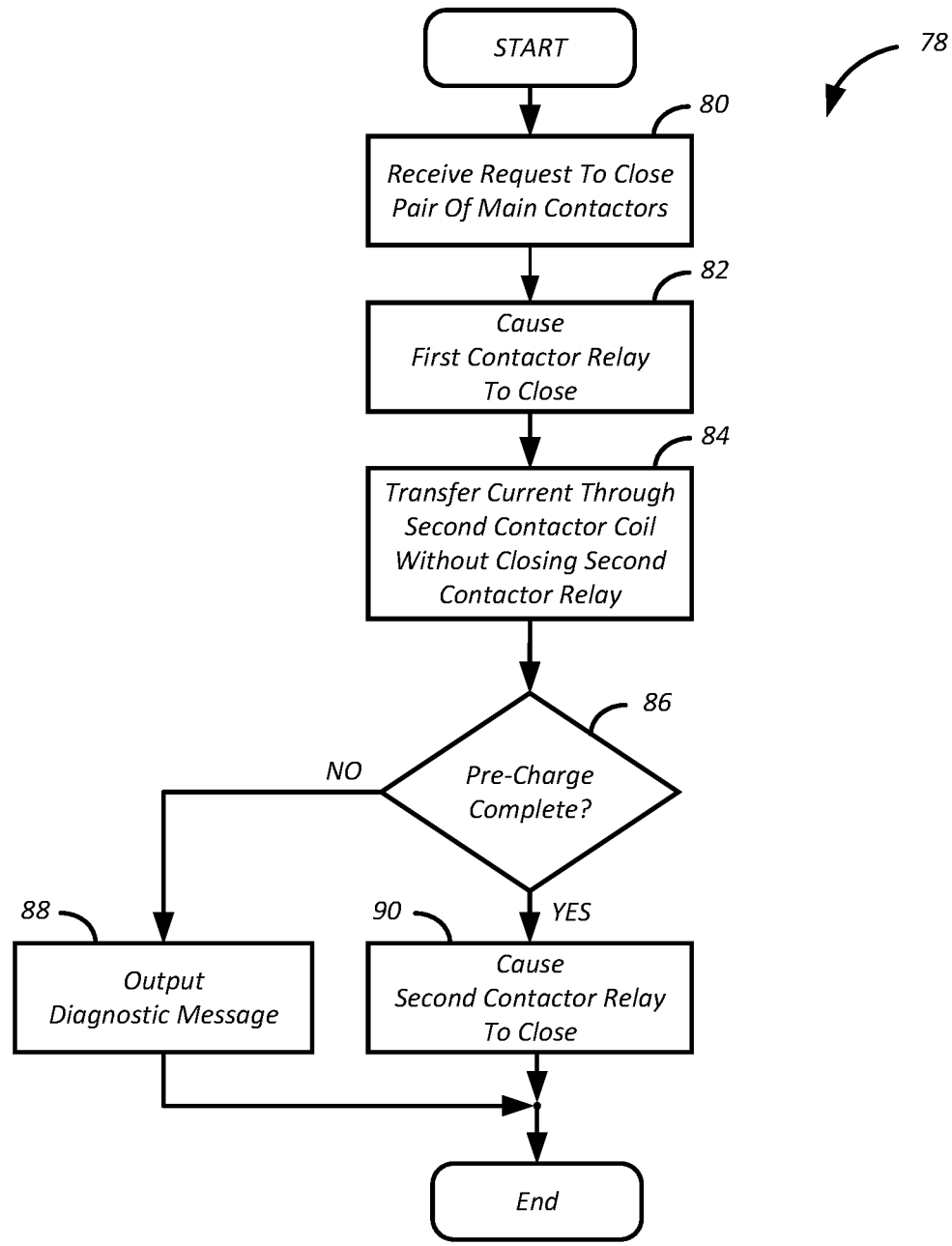
FIG. 5 is a flowchart illustrating an algorithm for pre-charging an electrical load using a main contactor coil.

In reference to FIG. 5, an example process 78 for pre-charging the main load 34 is shown. The process 78 may begin at block 80 where the battery controller 16 receives a signal indicative of a request to close the contactors 42a, 42b, e.g., request to close respective relays of the contactors 42a, 42b. In response to the request, the battery controller 16 may at block 82 cause, such as by issuing a command to the BEC 18 and so on, the contactor 42b to close. In one example, the battery controller 16 may cause the contactor 42b to close by causing a relay of the contactor 42b to close. At block 84 the battery controller 16 may transfer current from the traction battery 14 through the coil 58 of the contactor 42a to pre-charge the main load 34 without causing the relay 60 of the contactor 42a to close.

The battery controller 16 may determine at block 86 whether a pre-charge of the main load 34 is complete. In one example, the battery controller 16 may determine whether a pre-charge of the main load 34 is complete based on determining whether a voltage drop across the contactor 42a fell below a specified threshold. In another example, the battery controller 16 may wait a predetermined period prior to determining whether a voltage drop across the contactor 42a fell below a specified threshold. At block 88 the battery controller 16 may output a diagnostic message indicative of a pre-charge error in response to determining at block 86 that a pre-charge of the main load 34 is not complete, e.g., a voltage drop across the contactor 42a is above a specified threshold after a predefined period. The battery controller 16 may then exit the process 78.

At block 90 the battery controller 16 may cause, e.g., by transmitting a command to the BEC 18, the relay 60 of the contactor 42a to close in response to determining at block 86 that a pre-charge of the main load 34 is complete, e.g., a voltage drop across the contactor 42a is less than a specified threshold. The process 78 may then end. In some examples, the process 78 may be repeated in response to receiving a signal indicative of a request to close the contactors 42a, 42b, e.g., request to close respective relays of the contactors 42a, 42b, or in response to another signal or request.

Figure 6:
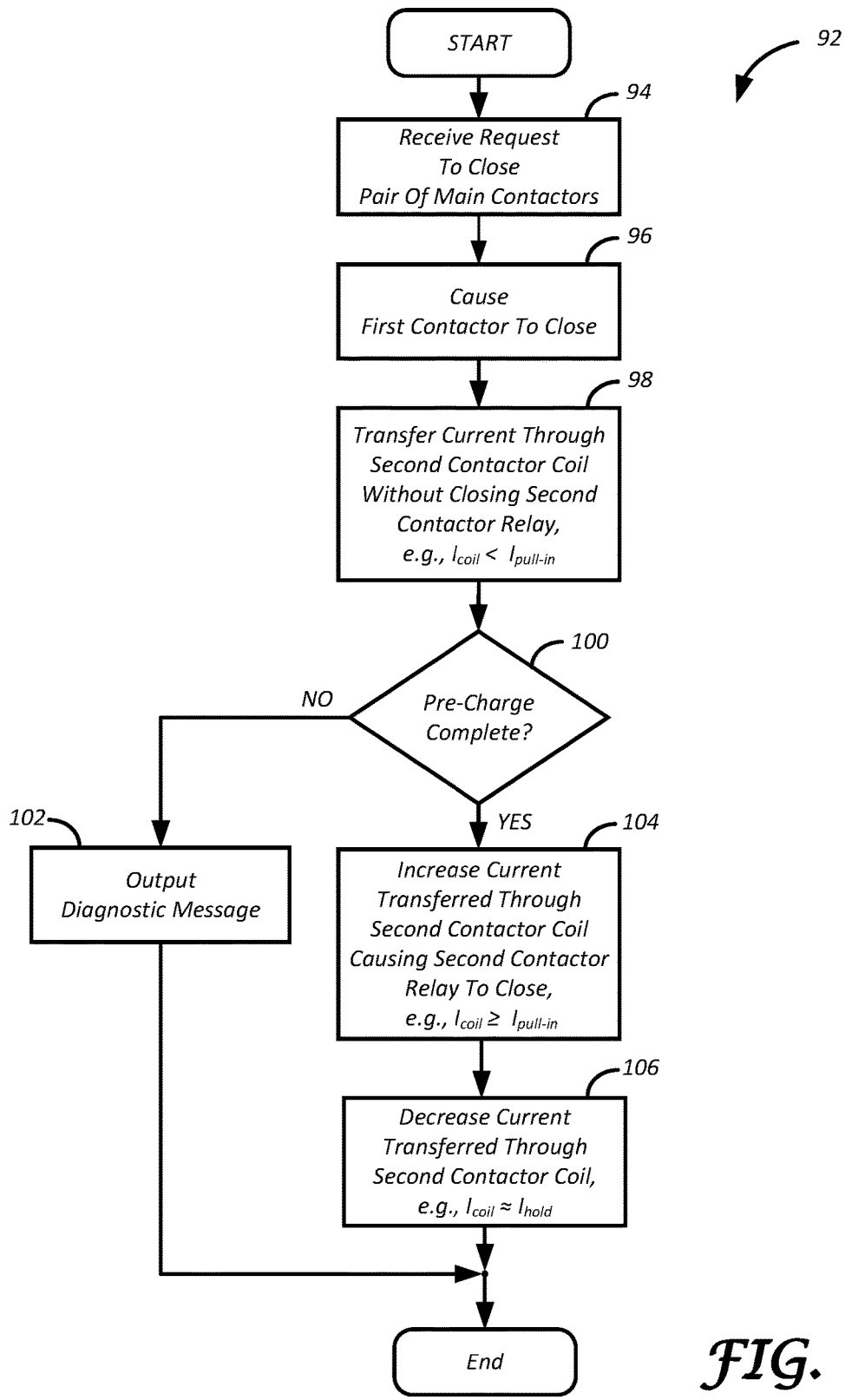
FIG. 6 is a flowchart illustrating an algorithm for performing pre-charge using magnitude of current.

In reference to FIG. 6, an example process 92 for pre-charging the main load 34 is shown. The process 92 may begin at block 94 where the battery controller 16 receives a signal indicative of a request to close the contactors 42a, 42b, e.g., request to close respective relays of the contactors 42a, 42b. In response to the request, the battery controller 16 may at block 96 cause, such as by issuing a command to the BEC 18, the relay of the contactor 42b to close. At block 98 the battery controller 16 may transfer current through the coil 58 of the contactor 42a without closing the relay 60 of the contactor 42a. In one instance, the battery controller 16 may enable the switch 62b to operate at a specified duty cycle such that current flowing through the coil of the contactor 42a is less than a predefined current, e.g. less than pull-in current $I_{pull\_in}$ of the relay 60 of the contactor 42a.

The battery controller 16 may determine at block 100 whether pre-charge of the main load 34 is complete. In one example, the battery controller 16 may determine whether a pre-charge of the main load 34 is complete based on determining whether voltage across the contactor 42a is less than a specified threshold. In another example, the battery controller 16 may wait a predetermined period prior to determining whether voltage across the contactor 42a is less than a specified threshold. At block 102 the battery controller 16 may output a diagnostic signal indicative of a pre-charge error in response to determining at block 100 that a pre-charge of the main load 34 did not complete, e.g., voltage across the contactor 42a is greater than a specified threshold after a predefined period. The battery controller 16 may then exit the process 92.

At block 104, in response to determining at block 100 that a pre-charge of the main load 34 is complete, the battery controller 16 may increase current transferred through the coil 58 of the contactor 42a causing the relay 60 of the contactor 42a to close. In one instance, the battery controller 16 may increase current transferred through the coil 58 of the contactor 42a by transmitting a signal to the BEC 18 indicative of a request to enable one or more switches to operate at a specified duty cycle. In such an example, the battery controller 16 may enable the switches 62a, 62b to operate at a specified duty cycle such that current through the coil 58 of the contactor 42a is no less than pull-in current $I_{pull\_in}$, e.g., greater than or equal to pull-in current $I_{pull\_in}$, of the relay 60 of the contactor 42a.

In an example, a predefined period after causing the relay 60 to close, the battery controller 16 at block 106 may decrease current transferred through the coil 58 such that the relay 60 of the contactor 42a remains closed. In such an example, the battery controller 16 may decrease current transferred through the coil 58 by transmitting a signal to the BEC 18 indicative of a request to enable the switches 62a, 62b to operate at a specified duty cycle such that current through the coil 58 is no less than, e.g., greater than or equal to, hold current $I_{hold}$ of the relay 60, where hold current $I_{hold}$ of the relay 60 is less than pull-in current $I_{pull\_in}$ of the relay 60 and greater than drop-out current $I_{drop\_out}$ of the relay 60. At this point the process 92 may end. In one example, the process 92 may be repeated in response to receiving a signal indicative of a request to close the contactors 42a, 42b, e.g., request to close respective relays of the contactors 42a, 42b, or in response to another signal or request.

Figure 7:
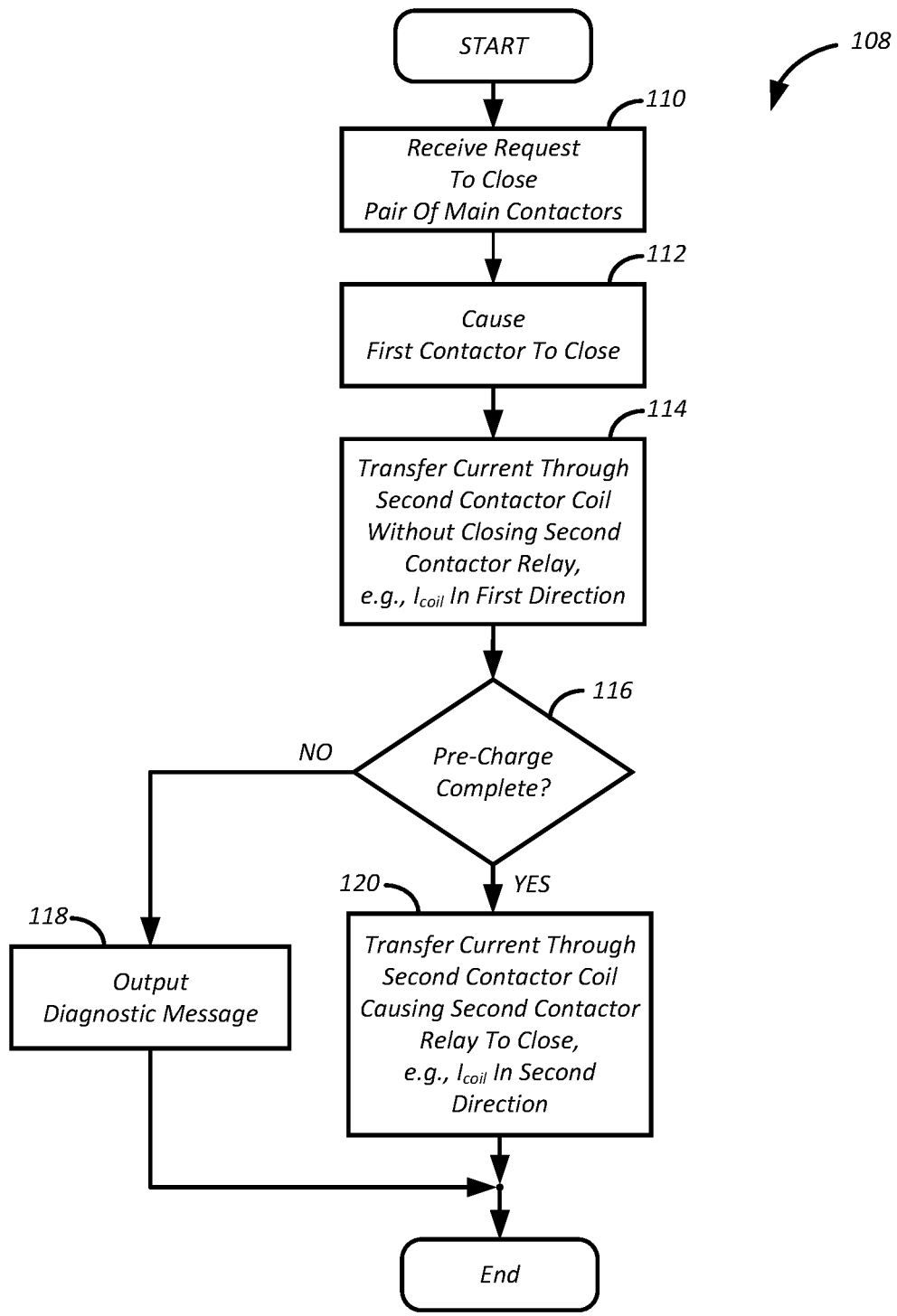
FIG. 7 is a flowchart illustrating an algorithm for performing pre-charge using direction of current.

In reference to FIG. 7, an example process 108 for pre-charging the main load 34 is shown. The process 108 may begin at block 110 where the battery controller 16 receives a signal indicative of a request to close the contactors 68a, 68b, e.g., request to close respective relays of the contactors 68a, 68b. In response to the request, the battery controller 16 may at block 112 cause, such as by issuing a command to the BEC 18, the relay of the contactor 68b to close. At block 114 the battery controller 16 may transfer current through the coil 70 of the contactor 68a without closing the relay 72 of the contactor 68a. In one example, the battery controller 16 may transfer current through the coil 70 of the contactor 68a without closing the relay 72 of the contactor 68a by enabling current through the coil 70 to be in the first direction 74a. In such an example, the battery controller 16 may enable the switches 76b, 76d to operate at a specified duty cycle such that current through the coil 70 is in the first direction 74a.

The battery controller 16 may determine at block 116 whether pre-charge of the main load 34 is complete. In one example, the battery controller 16 may determine whether a pre-charge of the main load 34 is complete based on determining whether voltage across the contactor 68a is less than a specified threshold. In another example, the battery controller 16 may wait a predetermined period prior to determining whether voltage across the contactor 68a is less than a specified threshold. At block 118 the battery controller 16 may output a diagnostic signal indicative of a pre-charge error in response to determining at block 116 that a pre-charge of the main load 34 did not complete, e.g., voltage across the contactor 68a is greater than a specified threshold after a predefined period. The battery controller 16 may then exit the process 108.

At block 120, in response to determining at block 116 that a pre-charge of the main load 34 is complete, the battery controller 16 may transfer current through the coil 70 of the contactor 68a causing the relay 72 of the contactor 68a to close. In one example, the battery controller 16 may transfer current through the coil 70 of the contactor 68a causing the relay 72 to close by enabling current through the coil 70 to be in the second direction 74b. In such an example, the battery controller 16 may disable operation of the switches 76b, 76d and enable the switches 76a, 76c to operate at a specified duty cycle such that current through the coil 70 is in the second direction 74b. At this point the process 108 may end. In one example, the process 108 may be repeated in response to receiving a signal indicative of a request to close the contactors 68a, 68b, e.g., request to close respective relays of the contactors 68a, 68b, or in response to another signal or request.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle system comprising:
    a contactor including a coil and relay;
    a switching arrangement;
    a traction battery;
    a load; and
    a controller configured to operate the switching arrangement at a specified duty cycle to transfer current from the traction battery through the coil to pre-charge the load without causing the relay to close such that a voltage drop across the relay falls below a threshold value, and subsequently cause the relay to close.

2. The system of claim 1, wherein causing the relay to close includes causing a magnitude of the current to increase.

3. The system of claim 1, wherein causing the relay to close includes causing a direction of the current to change.

4. The system of claim 1, wherein operating the switching arrangement at the specified duty cycle includes operating a plurality of switches of the switching arrangement such that current through the coil flows in a first direction defining an open position of the relay, and wherein causing the relay to close includes operating the plurality of switches of the switching arrangement such that current through the coil flows in a second direction defining a closed position of the relay.

5. The system of claim 1, wherein the switching arrangement forms an H-bridge.

6. The system of claim 1, wherein transferring current from the traction battery through the coil to pre-charge the load without causing the relay to close includes operating the switching arrangement at a first duty cycle, and wherein causing the relay to close includes operating the switching arrangement at a second duty cycle larger than the first duty cycle.

7. The system of claim 6, wherein the first duty cycle defines a magnitude of current through the coil as being below a pull-in current magnitude associated with the relay and the second duty cycle defines a magnitude of current through the coil as being above the pull-in current magnitude associated with the relay.

8. A method for a vehicle comprising:
    operating, by a controller, a switching arrangement at a specified duty cycle to transfer current from a traction battery through a coil of a contactor to pre-charge a load without causing a relay of the contactor to close such that a voltage drop across the relay falls below a threshold value, and subsequently causing the relay to close.

9. The method of claim 8, wherein causing the relay to close includes causing a magnitude of the current to increase.

10. The method of claim 8, wherein causing the relay to close includes causing a direction of the current to change.

11. The method of claim 8, wherein operating the switching arrangement at the specified duty cycle includes operating a plurality of switches of the switching arrangement such that current through the coil flows in a first direction defining an open position of the relay, and wherein causing the relay to close includes operating the plurality of switches of the switching arrangement such that current through the coil flows in a second direction defining a closed position of the relay.

12. The method of claim 8, wherein the switching arrangement forms an H-bridge.

13. The method of claim 8, wherein transferring current from the traction battery through the coil to pre-charge the load without causing the relay to close includes operating the switching arrangement at a first duty cycle, and wherein causing the relay to close includes operating the switching arrangement at a second duty cycle larger than the first duty cycle.

14. The method of claim 13, wherein the first duty cycle defines a magnitude of current through the coil as being below a pull-in current magnitude associated with the relay and the second duty cycle defines a magnitude of current through the coil as being above the pull in current magnitude associated with the relay.

15. A vehicle system comprising:
    a switching arrangement in connection with a coil and relay of a contactor;
    a traction battery;
    a load; and
    a controller configured to operate the arrangement at a specified duty cycle to transfer current from the traction battery through the coil to pre-charge the load without causing the relay to close such that a voltage drop across the relay falls below a threshold value, and subsequently cause the relay to close.

16. The system of claim 15, wherein causing the relay to close includes causing a magnitude of the current to increase.

17. The system of claim 15, wherein causing the relay to close includes causing a direction of the current to change.

* * * * *